United States Patent [19]

Beauval

[11] Patent Number: 5,022,075
[45] Date of Patent: Jun. 4, 1991

[54] MECHANICAL ASSEMBLY FOR ENSURING ELECTRICAL SAFETY IN A TELEPHONE SET OR TERMINAL

[75] Inventor: Didier Beauval, Tourville Sur Arques, France

[73] Assignee: Telic Alcatel, Paris, France

[21] Appl. No.: 336,473

[22] Filed: Apr. 12, 1989

[30] Foreign Application Priority Data

Apr. 12, 1988 [FR] France ................................. 88 04826

[51] Int. Cl.$^5$ ...................... H04M 1/00; H01R 13/44; H01R 13/62
[52] U.S. Cl. .................................... 379/445; 379/451; 439/133; 439/304; 70/DIG. 72
[58] Field of Search ................ 379/451, 455, 437, 83; 70/DIG. 34, DIG. 72; 439/133, 364

[56] References Cited

U.S. PATENT DOCUMENTS 4,609,790  9/1986  Kaiwa et al. ........................ 379/445
4,615,575 10/1986  Kossar ................................. 439/304

FOREIGN PATENT DOCUMENTS 2610466  8/1988  France .............................. 379/445
63-313918 12/1988  Japan .............................. 379/447

Primary Examiner—Jin F. Ng
Assistant Examiner—Jason Chan
Attorney, Agent, or Firm—Sughrue, Mion, Zinn, Macpeak & Seas

[57] ABSTRACT

The mechanical safety assembly for a telephone set having a housing with a cover including a sliding lock for closing the cover (7). The lock includes an operating head (13) external to the body (1) of the telephone set or terminal. The head fits flush with the wall of the body (1) when in the closed position and leaving only smooth surface visible, one of said surfaces (23) being pierced with a hooking aperture (24) which is accessible by a tip (25) of a paperclip or ballpoint pen.

5 Claims, 2 Drawing Sheets

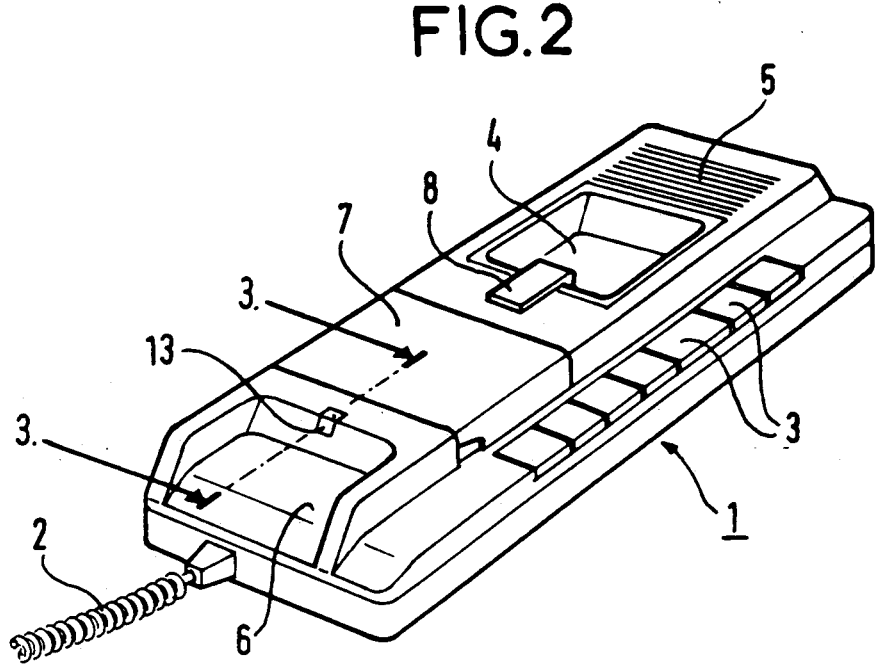
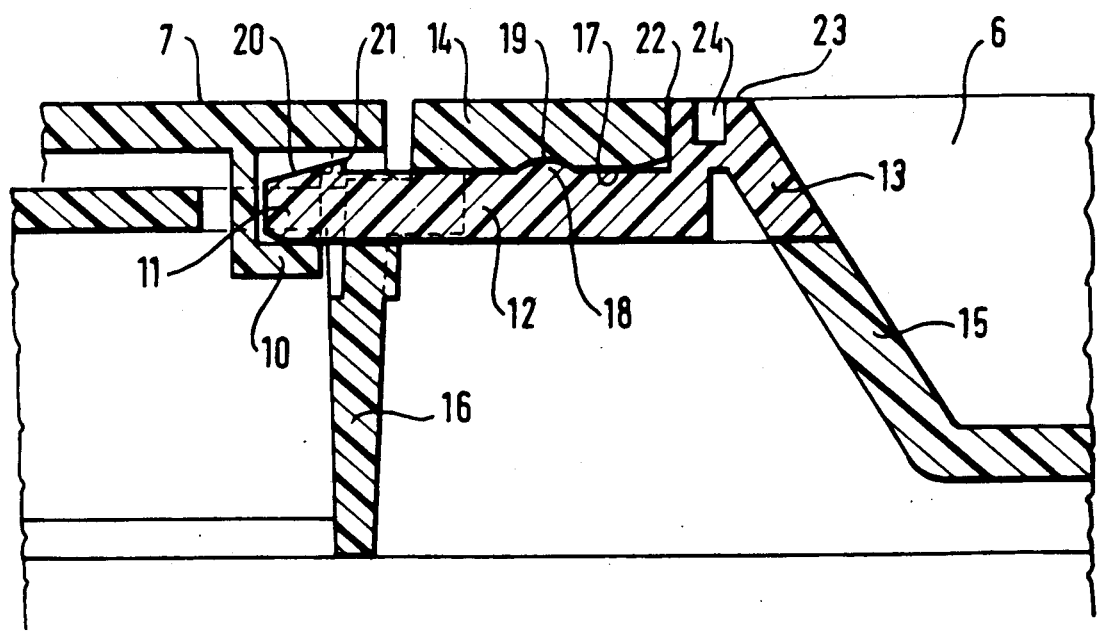

MECHANICAL ASSEMBLY FOR ENSURING ELECTRICAL SAFETY IN A TELEPHONE SET OR TERMINAL

FIELD OF THE INVENTION

The present invention relates to telephone sets or terminals.

BACKGROUND OF THE INVENTION

Safety standards require that any part of a telephone set or terminal which is accessible to the hand without requiring a tool should not be subject to an electrical potential dangerous to the user. In ordinary telephone sets, this condition can be met by providing housings which can be opened only by using tools, by employing screws or locking studs which cannot be undone without a screwdriver. In some telephone terminals which require a housing with a cover to receive a battery or a cassette for a telephone answering machine, for example, the cover is still secured by screwed locking means, but this is inconvenient for the user who does not always have a screwdriver available when a battery or cassette needs changing.

The object of the present invention is to ensure the electrical safety of a telephone set or terminal of the type having a housing with a cover to allow a removable component to be fitted, without sacrificing convenience of manipulation by the user.

SUMMARY OF THE INVENTION

The invention provides a mechanical assembly for ensuring electrical safety in a telephone set or terminal of the type including a housing with a cover. Said mechanical assembly consists of a sliding lock for closing the cover, said lock presenting an operating head outside the housing, which head, in the closed position, fits flush with the side wall of the housing and leaves only smooth, relief-free surfaces visible, one of said surfaces being pierced with a hooking aperture for a tip such as the end of a paperclip or a ballpoint pen, which objects are commonly to be found near a telephone.

In a preferred embodiment, the sliding lock includes a keeper integral with the cover, the keeper cooperating with a latch which is joined to the operating head via a bolt of rectangular cross-section which slides in the wall of the housing and which is provided with a resilient catch which maintains the lock in the closed position.

Other characteristics and advantages of the invention are apparent from the following description of an embodiment given by way of example. This description refers to the drawings.

BRIEF DESCRIPTION OF THE DRAWINGS

FIG. 2 is an overall perspective view of the body of the telephone set shown partially in FIG. 1; and FIG. 3 is a sectional view of the lock along line 3—3 of FIG. 1.

DESCRIPTION OF THE PREFERRED EMBODIMENT

Figure 1:
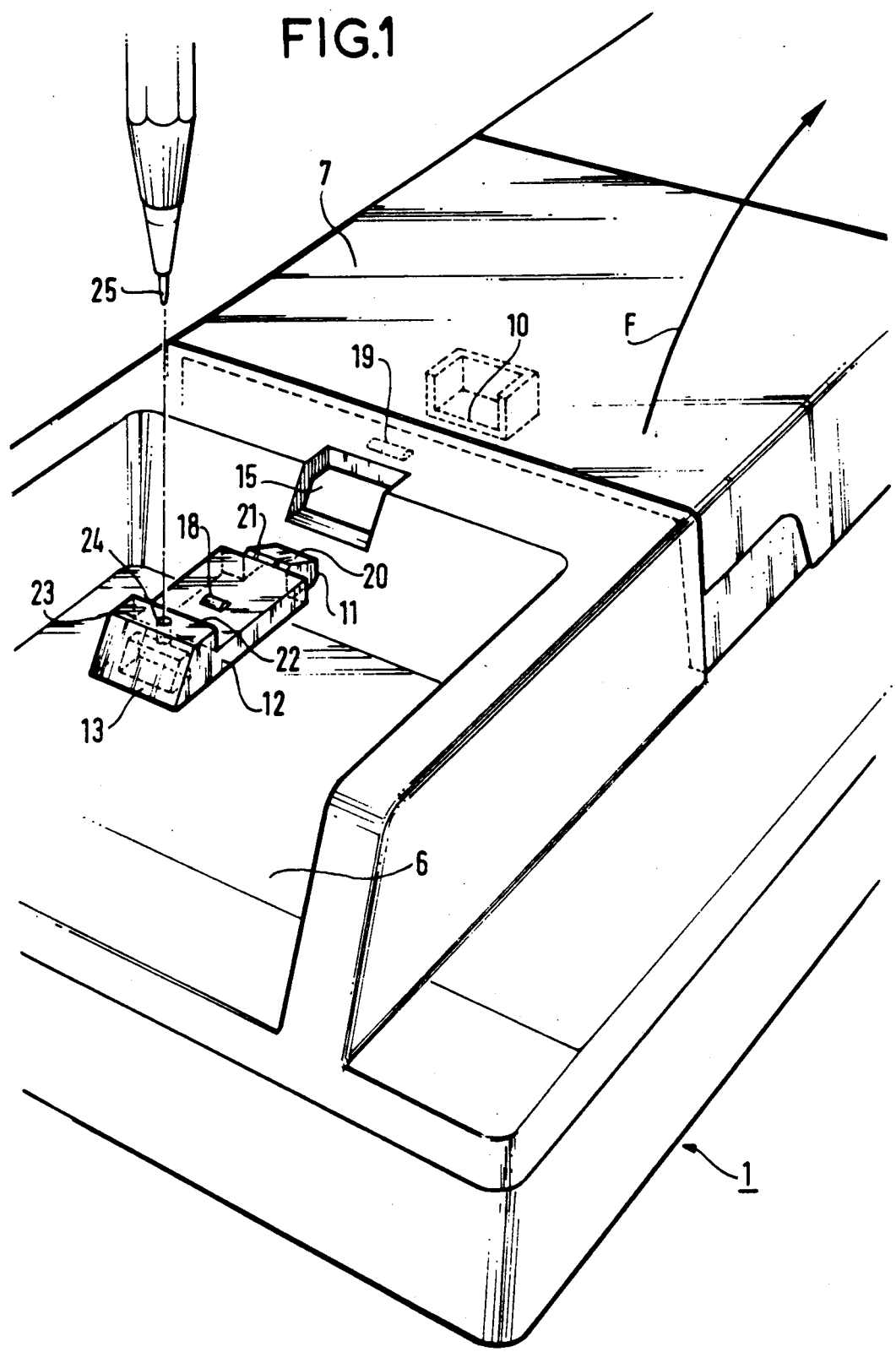
FIG. 1 is a partial perspective view of the body of a telephone set having a cover with its lock disengaged.

FIGS. 1 and 2 show the body 1 of a wall-mounted telephone set without the handset, the handset being connected to the body by a cord 2 which originates from the base of the body 1. The body 1 of the telephone set encloses the parts of a telephone answering machine with a cassett and a loudspeaker. It is in the shape of a long rectangle. A row of keys 3 for controlling the answering machine is provided on its right-hand side, the body also being provided with two superposed rectangular recesses 4, 6, with the top wall of the body, in which the ends of the telephone handset are received. One of the recesses 4 is situated below a grille 5 which covers a compartment for the loudspeaker of the answering machine, whereas the other recess 6 is situated below a cover 7 which closes a compartment for the cassette of the answering machine. When the telephone handset is hung up, it is held in place on the body by a hook 8 situated at the base of the upper recess 4.

The cover 7 pivots to open in the direction shown by arrow F (FIG. 1) to give access to the cassette of the answering machine. Since an answering machine cassette does not require routine changing, the cover does not often need to be opened, so it is possible to ensure electrical safety of the user without causing excessive inconvenience, by locking the cover with a sliding lock which cannot be opened by hand without a tool such as the tip of a paper clip or of a ballpoint pen, which objects are readily found within reach of a telephone. This lock, which is shown in more detail in FIG. 1 and 3, comprises a keeper 10 integral with the inside wall of cover 7, the keeper being engaged by a latch 11 located at the end of a bolt 12 which slides in the wall of the body 1 and which terminates at its other end in an operating head 13 which is accessible from the lower recess 6.

Bolt 12 is rectangular in cross-section. It forms a sliding fit beneath the upper wall of the body 1 through two aligned openings, one formed through the side wall 15 of the lower recess 6 and the other formed through an internal partition 16 which forms one of the side walls of the compartment for the answering machine cassette. The upper face of the bolt rubs against the lower face 17 of the upper wall 14 of the body 1 and presents a resilient boss 18 which co-operates with a cavity 19 in that lower face 17 in order to constitute a catch for maintaining the lock in the closed position.

Latch 11 has an oblique upper slope 20 which allows the keeper 10 to push the latch into the open position if it is not there already when the cover 17 is closed. This oblique slope 20 terminates above the bolt 12 in a protruding peak 21 which limits the opening movement of the lock by abutting against the upper wall of the body 1.

The height of the operating head 13 is taller than the bolt 12, and at the point where they meet, the head presents a shoulder 22 which limits the closing movement of the lock by abutting the upper wall 14 of the body 1. In the closed position, the head fits flush with the side wall of the lower recess 6 and only smooth, relief-free surfaces remain visible, i.e. surfaces which cannot be gripped with the fingers. The top surface 23 of the head lies flush with the top surface of the body and it is pierced by a hooking aperture 24 which is accessible with the tip 25 of a paperclip or ballpoint pen, whereby the head can be pulled back to open the lock. The lock can be closed simply by pushing it with a finger.

Arrangements can be modified or devices can be replaced by equivalent devices without departing from the scope of the present invention.

I claim:

1. A mechanical assembly for ensuring electrical safety in a telephone set having a body (1) with a pivotable cover (7), a top recess adjacent said cover, said assembly comprising a sliding lock within said body for locking the cover (7) in a slidably closed position, said lock having an operating head (13) projectable outside the body (1) and which, in the closed position of the lock, has an end surface which fits flush with a wall of the body (1) so that only smooth surfaces including said end surface and a top surface (23) are visible with the lock in closed position and said top surface (23) being provided with an aperture (24) accessible by a tip of a tool sized thereto for effecting sliding of the lock between closed and open positions.

2. An assembly according to claim 1, wherein the sliding lock includes a keeper (10) integral with the cover (7), said keeper engaging a sliding latch (11) connected to the operating head (13) of the lock by a bolt (12) which slides in an end wall of the body (1).

3. An assembly according to claim 2, wherein the lock includes a resilient boss (18) on the bolt (12) said boss engaging a facing complementary cavity (19) formed in a facing surface of the wall of the body (1), forming a catch for maintaining the lock in the closed position.

4. An assembly according to claim 2, wherein the sliding latch (11) terminates on the side adjacent the bolt in a peak (21) which, in the open position, abuts a top wall of the body.

5. An assembly according to claim 2, wherein the operating head (13) defines a shoulder (22) with the bolt, said shoulder abutting against a top wall of the body when in the lock closed position.

* * * * *